US006754838B2

(12) United States Patent
Burns et al.

(10) Patent No.: US 6,754,838 B2
(45) Date of Patent: Jun. 22, 2004

(54) METHOD FOR REDUCING TUNING ETCH IN A CLOCK-FORWARDED INTERFACE

(75) Inventors: Douglas J. Burns, Westford, MA (US); Roger Dame, West Brookfield, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 612 days.

(21) Appl. No.: 09/770,589

(22) Filed: Jan. 26, 2001

(65) Prior Publication Data

US 2002/0104035 A1 Aug. 1, 2002

(51) Int. Cl.[7] .............................................. G06F 1/12
(52) U.S. Cl. ...................... 713/401; 713/503; 713/600; 438/689
(58) Field of Search ................................. 713/400, 401, 713/500, 503, 600; 438/584, 598, 618, 689; 327/100, 141

(56) References Cited

U.S. PATENT DOCUMENTS 5,394,024 A * 2/1995 Buckenmaier et al. ...... 327/160
5,570,053 A * 10/1996 Takla ........................... 327/292
5,717,729 A * 2/1998 Iknaian et al. ............... 375/356
6,529,424 B2 * 3/2003 Koutsoures .................. 365/194
6,587,907 B1 * 7/2003 Ashby ......................... 710/300
6,618,816 B1 * 9/2003 Ido et al. ..................... 713/503

* cited by examiner

Primary Examiner—Thomas Lee
Assistant Examiner—Thuan Du

(57) ABSTRACT

A clock forwarding scheme for use in a system comprising a plurality of communications links, each link configured to transmit data packets and a forwarded clock from a transmitting device to a receiving device. The required delay in the forwarded clock signal is generated at the transmitting device by adding tuning etch to the signal path for the forwarded clock signal prior to transmission of the forwarded clock signal and data packets. The source device preferably has at least two clock output pins to deliver two synchronous clock signals off the device and at least two clock input pins to receive the clock signals. One of the two clock signals is delayed with respect to the other via a longer conduction path. The delayed clock signal is used to trigger logic to transmit the forwarded clock signal. The undelayed clock signal is used to trigger logic to transmit data bits.

22 Claims, 4 Drawing Sheets

METHOD FOR REDUCING TUNING ETCH IN A CLOCK-FORWARDED INTERFACE

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention generally relates to a computer system comprising a plurality of pipelined, superscalar microprocessors. More particularly, the invention relates to communication of data between a core logic chipset and multiple processors. More particularly still, the invention relates to the recovery of data transmitted along different point-to-point data paths between components in the chipset and the processors.

2. Background of the Invention

It often is desirable to include multiple processors in a single computer system. This is especially true for computationally intensive applications and applications that otherwise can benefit from having more than one processor simultaneously performing various tasks. It is not for a multi-processor system to have 2 or 4 or more processors working in concert with one another. Typically, each processor couples to at least one and perhaps three or four other processors.

Such systems usually require data and commands (e.g., read requests, write requests, etc.) to be transmitted from one processor to another. As processor and bandwidth capabilities increase, the size of the data and command packets also increase. In transmitting this information between processors, it may be desirable to deliver these data packets in contiguous form. That is, the data is preferably transmitted along parallel data traces between respective processors. To accomplish this, signal paths between the processors must exist for each bit of information in a packet. A 32-bit long packet therefore would require 32 separate signal paths between processors.

Many modern multi-processor systems rely on a core logic chipset to literally direct data traffic between processors and the outside world. A conventional core logic chipset includes, among other things, a memory controller and I/O interface circuitry. Older chipsets would also control cache memory, but newer designs are delegating this role to the processors to which the cache memories are connected. To improve bandwidth and reduce latency, chipsets are being designed with point-to-point, switched data transfer architectures rather than shared bus architectures. The switched architecture allows direct connection between two devices and aids performance by allowing for higher clock rates and also permits scalable bandwidth.

To take advantage of the direct, point-to-point connections between devices in the chipset, a clock forwarding technique is commonly used. In this technique (sometimes referred to as a source synchronous technique), timing signals are sent in parallel with data signals. This is compared to the method where the destination device samples the incoming data using a clock internal to the destination device and that is asynchronous to the incoming data (i.e., rising and falling edges do not align with respect to time). In the clock-forwarding scheme, the clock and data are fully synchronized, which permits more efficient data extraction by the destination device.

Clock forwarding transmission schemes work by sampling the incoming data at the receiving device using the corresponding forwarded clock signal. The receiving device commonly employs a latch or series of latches (flip-flops) to sample the data. The latches are triggered using the forwarded clock such that the data is pulled into the receiving device at the appropriate rising or falling edge of the forwarded clock signal.

The data sampling latches used in this transmission scheme require that the data be present at the input to the latch for a minimum amount of time before and after the latch is triggered by a forwarded clock edge. This is referred to as the setup and hold time requirements for a latch. The setup and hold requirements, if met, guarantee that the data is sampled reliably. If this setup and hold time is violated the sampled signal becomes unstable and unreliable. In actual implementations of the clock-forwarding scheme, the forwarded clock must be delayed slightly to guarantee that the data arrives at the sampling latches before the corresponding clock edge arrives. This timing adjustment is referred to as clock tuning. Clock tuning is typically implemented by adding etch to the clock signal trace. If enough tuning etch is added, the setup and hold requirements of the sampling latches can be met and the data can be reliably extracted by the receiving device.

The process of tuning a forwarded clock is iterative and can be cumbersome. Theoretical values for the required length of tuning etch are determined before hand based on the length of the data paths. Computer aided design (CAD) designers can lay in additional etch to the forwarded clock traces, but tests must be run on actual hardware to determine if more or less tuning etch is needed for a given data group. The designs are then altered in the CAD database and the process is repeated. The tuning process is therefore time consuming, tedious, and error-prone.

Modern core logic chipsets include a number of devices, each capable of transmitting data to and from a processor. For example, the Compaq 21264 Alpha processor has employed a core logic chipset that includes ASIC chips capable of transmitting 64-bit data bundles to four separate processors. Transmitting 64 bits of data in parallel can monopolize a large amount of real estate on a system board or motherboard. In many cases, the data bundles are separated into sub-bundles to allow for more efficient use of board space. In such cases, each sub-bundle is transmitted with its own forwarded clock to guarantee reliable data transmission.

One drawback to separating the data bundles into sub-bundles is that each forwarded clock must be tuned individually. Since the routing path for each sub-bundle will invariably be unique, the amount of tuning etch needed for each forwarded clock will be different. In a multi-processor system, this problem quickly grows into an enormous task. If we assume a 64-bit data bundle is separated into 8 sub-bundles and our system has four processors, we quickly find that there are 32 separate forwarded clock traces that must be individually tuned. This number is effectively doubled if you consider the tuning required for the forwarded clocks associated with data transmission in the opposite direction. Not only does this tuning require a large amount of board real estate, but also time and money.

Another consideration in a clock-forwarding transmission scheme relates to skew problems. Since board area is needed to allow for etch tuning of the forwarded clocks, the most direct data path from source to destination is not always used. This results in skew between the data sub-bundles. That is, the data sub-bundles arrive at their destination at different times. This creates latency delays due to the additional time required for the receiving device to reconstruct the original data bundle from the sub-bundles.

It is desirable therefore, to develop a data transmission scheme that successfully eliminates the quantity of tuning etch required to reliably sample data at a receiving device. The transmission scheme preferably offers reliable data transfer between devices while minimizing latency and skew and maximizing bandwidth. The transmission scheme may also indirectly improve the manufacturability of printed wiring boards and processor hardware by easing the requirements for parallel, equal-length data paths. Design times may also be advantageously reduced by eliminating much of the iterative process required in tuning forwarded clock paths.

BRIEF SUMMARY OF THE INVENTION

The problems noted above are solved in large part by a clock forwarding scheme for use in a system comprising a plurality of communications links, each link configured to transmit data packets from a transmitting device to a receiving device. Each communications link includes a conduction path for each data bit in the data packet and at least one conduction path for a forwarded clock signal that is synchronously transmitted with the data packet. Tuning etch is eliminated from each individual forwarded clock path. Instead, the required setup and hold delay in the forwarded clock signal is generated at the transmitting device by adding tuning etch to the signal path for all forwarded clock signals prior to transmission of the forwarded clock signal and data bits. In other words, a single tuning etch is needed instead of one tuning etch for every communications link. The forwarded clock signal and data are advantageously transmitted via conduction paths in each communications link that are substantially parallel and of equal length.

Preferably, the plurality of communications links are of equal or similar length to eliminate or reduce skew.

The setup and hold delay is added upstream of the conventional location. The source device preferably has at least two clock output pins to deliver two synchronous clock signals off the device and at least two clock input pins to receive the clock signals. Termination circuits are coupled to these clock signals for adjusting duty cycles of the clock signals and improve symmetry of the forwarded clock and data signals downstream at the destination devices. One of the two clock signals is delayed with respect to the other via a longer tuning etch path between the output pins and input pins on the device. The delayed clock signal is used to trigger logic to transmit a forwarded clock signal to the plurality of communications links. The undelayed clock signal is used to trigger logic to transmit data bits to the plurality of communications links. These clock signals are used to trigger the output logic for each output port in the source device. In the preferred embodiment, a single tuning etch advantageously replaces four individual tuning etches that are typically associated with conventional source synchronous clock forwarding schemes.

BRIEF DESCRIPTION OF THE DRAWINGS

For a detailed description of the preferred embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections.

The term "latch" and "flip-flop", particularly a D flip-flop, are synonymous and refer to a logic device that samples an incoming digital signal and outputs the value of the input bit at a clock edge.

DETAILED DESCRIPTION OF THE PREFERRED EMBODIMENTS

Figure 1:
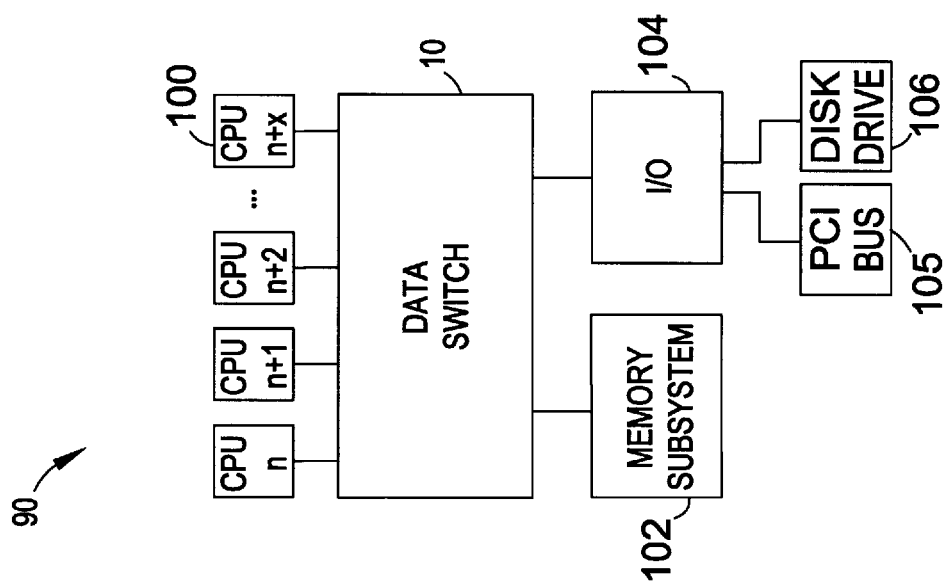
FIG. 1 shows a multi-processor system in which the preferred embodiment may be implemented.

In accordance with the preferred embodiment of the invention, the clock forwarding scheme described herein may be implemented in a computer system 90 as shown in FIG. 1. The computer system 90 is a multi-processor system comprising any number of processors 100. Each processor is preferably coupled to a data switch 10, which successfully implements a switch fabric connection between the processors 100, a memory 102 and an input/output (I/O) controller 104. For each interconnection between the data switch 10 and the other devices, data is transmitted with a forwarded clock and the data switch 10 implements the preferred clock forwarding scheme described in detail below.

In further accordance with the preferred embodiment, the I/O controller 104 provides an interface to various input/output devices such as an expansion bus such as a PCI Bus 105 or disk drive 106 as shown. The memory 102 preferably comprises SRAM memory devices, but other types of memory devices can be used if desired. The capacity of the memory devices 102 can be any suitable size. Further, memory devices 102 preferably are implemented as Dual Inline Memory Modules (DIMMs).

Figure 2:
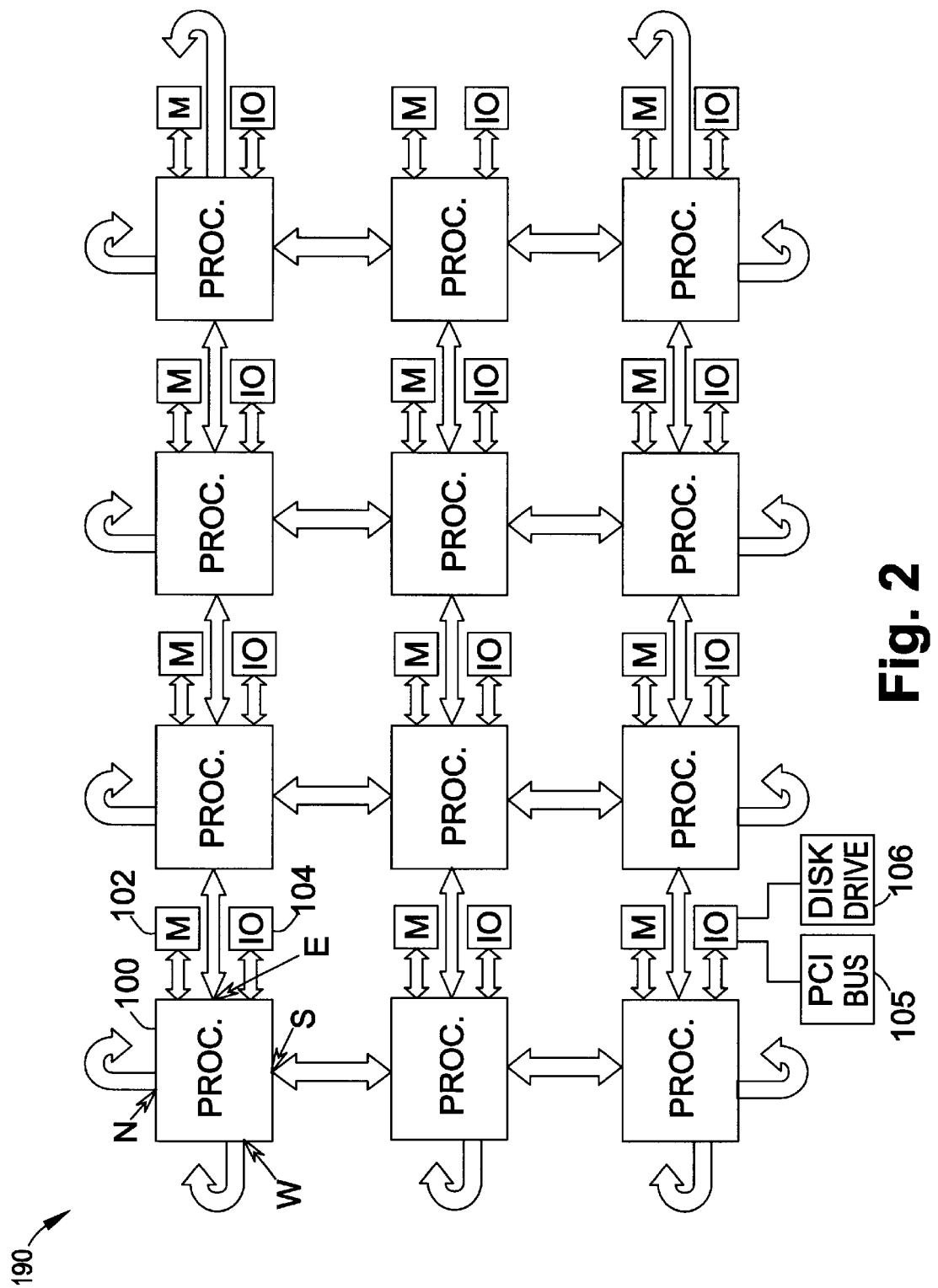
FIG. 2 shows an alternative multi-processor system in which the preferred embodiment may be implemented.

The preferred clock forwarding scheme described herein may also be implemented in a multi-processor system of the type shown in FIG. 2. In FIG. 2, the computer system 190 comprises one or more processors 100 coupled to a memory 102 and an I/O controller 104. Each processor preferably includes four ports for connection to adjacent processors. The inter-processor ports are designated "north," "south," "east," and "west" in accordance with the well-known Manhattan grid architecture. As such, each processor 100 can be connected to four other processors. The processors on both ends of the system layout wrap around and connect to processors on the opposite side to implement a 2D torus-type connection. Although 12 processors 100 are shown in the exemplary embodiment of FIG. 1, any desired number of processors (e.g., 256) can be included. Furthermore, while the computer systems 90, 190 shown in FIGS. 1 and 2 portray a multi-processor system, the preferred embodiment may also be successfully implemented in a single-processor computer system.

In general, computer system 190 can be configured so that any processor 100 can access its own memory 102 and PO devices as well as the memory and I/O devices of all other processors in the network. Preferably, the computer system may have physical connections between each processor resulting in low interprocessor communication times and improved memory and I/O device access reliability. If physical connections are not present between each pair of processors, a pass-through or bypass path is preferably implemented in each processor that permits accesses to a processor's memory and I/O devices by another processor through one or more pass-through processors. Thus, data from I/O devices may enter the 2D torus via any of the I/O controllers 104.

Figure 3:
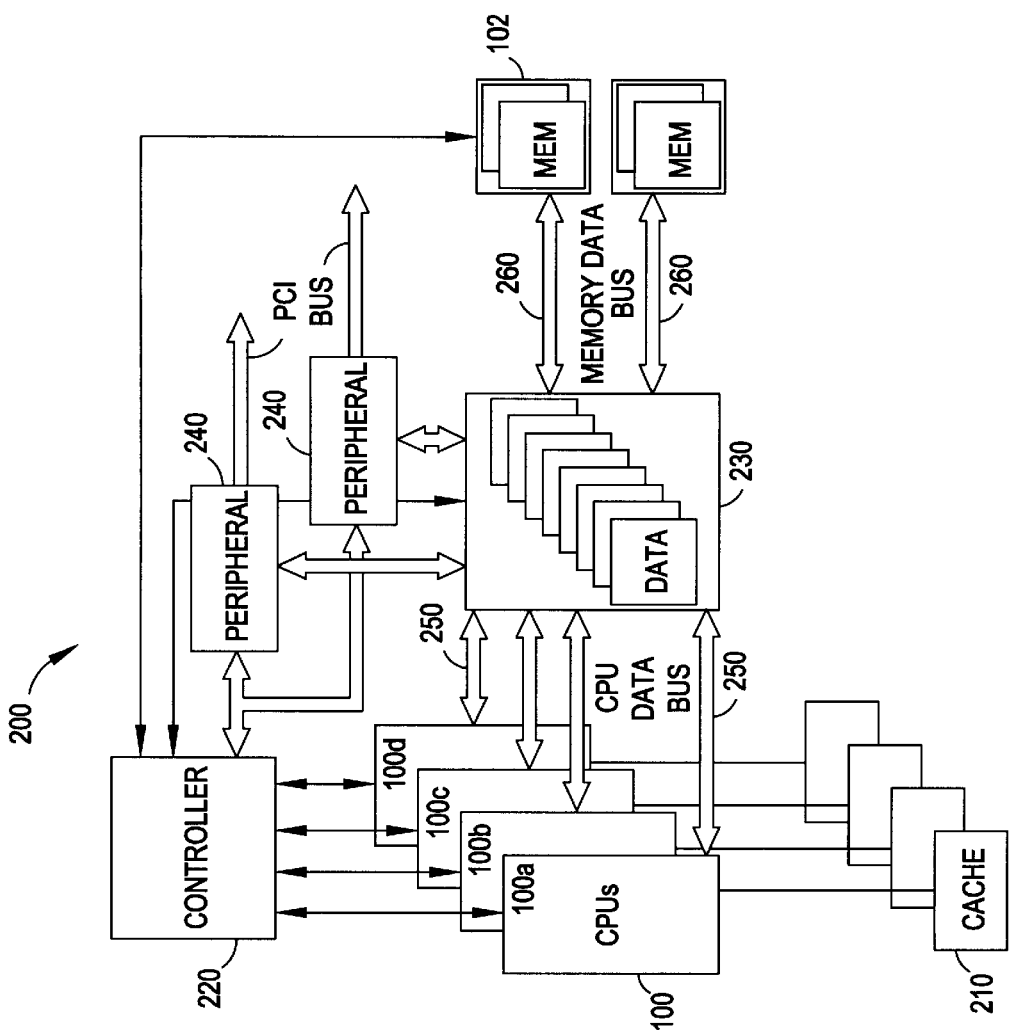
FIG. 3 shows a detailed diagram of the multi-processor chipset of the system in FIG. 1.

The preferred multi-processor computer system 90 shown in FIG. 1 may preferably be embodied in a core chipset 200 as shown in FIG. 3. The multi-processor architecture is implemented in a chipset 200 to accommodate the massive amount of logic as well as the large number of I/O pins required to support the wide buses between devices. In FIG. 3, the computer system comprises four processors (CPUs) 100, each with an associated data cache 210. The preferred embodiment shown in FIG. 3 also includes logic devices operating as controller devices 220, data handler devices 230, or peripheral interface devices 240. The controller device 220, data handler devices 230, and peripheral interface devices 240 are preferably embodied as ASIC chips, but may also be suitably implemented as FPGA devices or other types of logic circuits or devices.

The controller device 220 is responsible for control of the I/O and memory subsystem. The controller device 220 issues commands and addresses to the data handler devices 230 and peripheral interface devices 240, which are then responsible for actual data transfer. Each controller device 220 also provides address ports to access the CPUs 100.

The peripheral interface devices 240 provide I/O interface between the chipset 200 and external devices. The peripheral interface devices 240 communicate with the controller device 220 and data handler device 230 and provide fully independent PCI compliant buses. The PCI buses may preferably be coupled to external I/O devices such as PCI slots, ISA slots, and system I/O such as a mouse, keyboard, and disk drives, and one or more expansion board slots. Each peripheral interface device 240 supports a variety of transfers, including DMA and PCI to PCI transfers. The peripheral interface devices 240 are controlled by the controller device 220 and all data transfers to or from the chipset 200 are performed through the data handler chips 230. Thus, the tasks described above for the I/O controller 104 depicted in FIG. 1 are actually performed via the combination of the controller devices 220, data handler devices 230, and peripheral interface devices 240.

The data handler devices 230 are responsible for all data movement between the processors 100 and memory 102 and peripheral interface devices 240. Each data chip 230 is coupled to memory arrays 102 via a pair of memory data buses 260. The preferred embodiment uses industry standard PC 100 SDRAM modules and four modules fill a single memory array. Each data chip 230 also has four data bus ports for transmitting data along a CPU data bus 250 to four separate processors 100. The data handler devices 230 also contain a set of queues and accumulators to support DMA operations, buffering, and memory accumulation to allow fall bandwidth transfers from a pair of memory buses 260 to a single CPU 100. The data handling device 230 preferably implements a switched architecture which allows multiple, concurrent, point-to-point transactions between devices in the chipset 200.

The CPU data buses 250 shown in FIG. 3 provide an example of a location where the preferred embodiment may be implemented to reduce the quantity of tuning etch required in a clock-forwarding data transmission scheme. For each data bundle transmitted from a data handler device 230 to a CPU 100 along the CPU data bus 250, a forwarded clock signal is also transmitted from the data handler device 230 to the CPU 100. A schematic of the preferred embodiment of the clock-forwarding scheme used to transfer data from the data handler device 230 to a CPU 100 is shown in FIG. 4.

Figure 4:
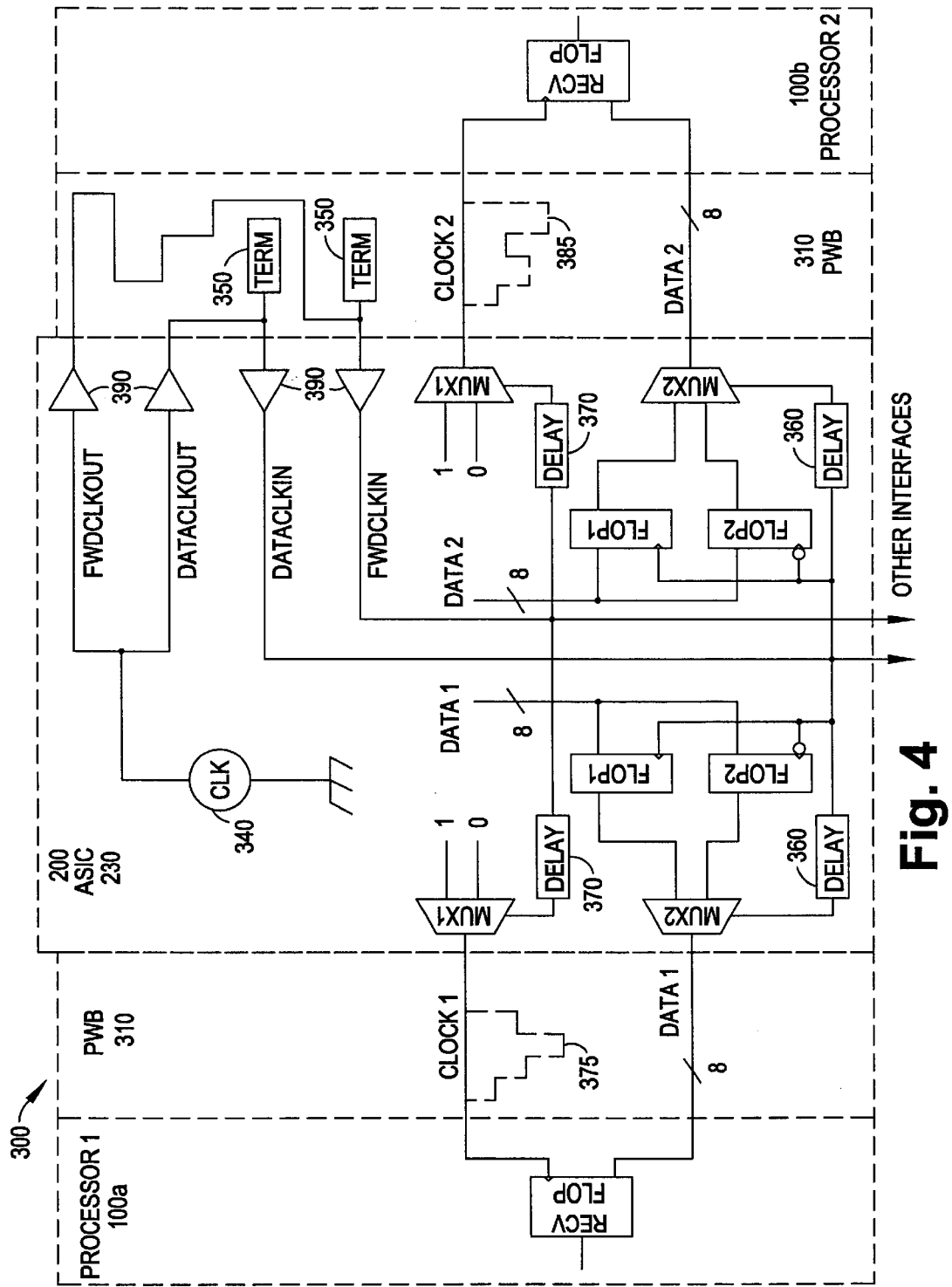
FIG. 4 shows a schematic representation of the preferred embodiment of the clock-forwarding data transmission scheme.

Referring now to FIG. 4, the preferred embodiment of the clock-forwarding scheme as configured for data transfer between a data handler device 230 and multiple processors 100a, 100b is shown. In the preferred embodiment, the core chipset 200, including all processors 100, and PWB 310 are assembled to form a common circuit card assembly (CCA) module 300. FIG. 4 shows the data handler device ASIC 230 (hereinafter referred to as ASIC 230) mounted to the same printed wiring board (PWB) 310 as processors 100a, 100b. Note that FIG. 4 represents only a schematic representation of a portion of the CCA module 300. The core chipset comprises additional devices as discussed above, but these devices have been omitted from FIG. 4 for clarity. Further, no specific board layout design should be inferred from the relative positions of the ASIC 230 and processors 100a, 100b shown in FIG. 4.

In the preferred embodiment, each ASIC 230 is capable of transmitting data to a plurality of processors. In addition, a common clock source 340 is used to generate two clock signals: FWDCLKOUT and DATACLKOUT. These signals are first delivered to buffers 390, which are identical in nature, to guarantee alignment of the FWDCLKOUT and DATACLKOUT signals prior to delivering the signals off chip. The FWDCLKOUT and DATACLKOUT are then transmitted off the ASIC 230, to the PWB 310, and routed back into the ASIC 230 as signals FWDCLKIN and DATACLKIN, respectively. The lengths of the two signal traces on the PWB 310 differ by the amount of tuning etch required to add sufficient delay to the forwarded clock signal that is transmitted with data from the ASIC 230 to the processors 100a, 100b. The FWDCLKIN and DATACLKIN signals are sampled into the ASIC 230 using buffers 390. The transmitting device (ASIC 230) should preferably be configured with output and input pins which allow these clock signals to be tuned off chip and returned to the transmitting device. By adding the tuning etch at this location, the clock delay is effectively inserted upstream, closer to the clock source. The delayed clock signals CLOCK1 and CLOCK2 are then transmitted with the data to the destination devices 100a, 100b.

The major advantage of this technique is that it eliminates the need to insert tuning etch upstream to the forwarded clock signal associated with each individual data bundle. The eliminated tuning etch is represented by the dashed traces 375, 385 located on the clock paths between ASIC 230 and processors 100a, 100b, respectively. Since the required tuning delay already exists in the clock signal, the clock etch may be routed parallel to the corresponding data paths. In the preferred embodiment, which includes four data bus ports per ASIC 230, this results in a 4:1 reduction in the quantity of tuning etch needed on the PWB 310.

An additional advantage to this technique results from the ability to route the data and forwarded clock signals parallel to each other. The parallel traces occupy less space and therefore, the traces may be routed in a generally direct path between the ASIC 230 and the processors 100a, 100b. This substantially reduces the variance in the path lengths between the devices and thereby reduces skew between data bundles. Latency delays are therefore reduced as well.

Termination networks 350 are included on the PWB 300 and are coupled to the clock signals DATACLKIN and FWDCLKIN. These termination networks 350 comprise resistor packs and may be altered to change the duty cycle of the clock signals. Signal asymmetries may develop due to trace routing downstream of the ASIC 230. The termination networks 350 can be adjusted as needed to compensate for these asymmetries and guarantee a 50% duty cycle in the clock and data signals as they arrive at processors 100a, 100b.

As the two clock signals (DATACLKIN and FWDCLKIN) are brought back into the ASIC 230, they are branched off to logic corresponding to each external port of the ASIC 230. In the preferred embodiment, the ASIC 230 includes four data bus ports. The clock signals are therefore distributed to four separate output logic circuits. In FIG. 4, logic for two of the four ports are shown for simplicity. The clock signals are used to trigger latches or flip-flops to sample data in preparation for transmission from the ASIC 230 to the processors 100a, 100b.

In the preferred embodiment, data is transmitted on both rising and falling edges of the forwarded clock signal. A pair of flip-flops, one that latches on the rising edge of a clock and one that latches on the falling edge of a clock, are used to sample the data (DATA1 or DATA2) that is to be transmitted to the processors 100a, 100b. These flip-flops (FLOP1 and FLOP2) are triggered by the DATACLKIN clock signal. The outputs of FLOP1 and FLOP2 are coupled to a multiplexer MUX2 that is configured to toggle between the outputs of FLOP1 and FLOP2. The multiplexer MU is triggered by the same DATACLKIN clock signal that was used to trigger latches FLOP1 and FLOP2. However, since there are propagation delays inherent in FLOP1 and FLOP2 and because MUX2 has its own setup and hold requirements for data sampling, the DATACLKIN clock signal must be delayed slightly. The DELAY circuitry 360 is carefully tuned to guarantee the characteristic delay signature established by the setup and hold requirements of the multiplexer MUX2. A substantially identical DELAY element 370 is included in the FWDCLKIN clock signal path. The delayed FWDCLKIN signal is subsequently used to toggle a separate multiplexer MUX1, which selects between a binary high and a binary low signal to create the forwarded clock signal that is transmitted from the ASIC 230 to the processors 100a, 100b. DELAY element 370 MUX1 are included in the forwarded clock signal path to replicate the delays found in the data path. This is done to eliminate skew problems and simplify design requirements.

The outputs of multiplexers MUX1 and MUX2 are then delivered off ASIC 230 to parallel traces on the PWB 310 and delivered to receiver logic in the processors 100a, 100b. It should be noted that since the same amount of delay is introduced to the DATACLKIN and FWDCLKIN signals (via DELAY elements 360, 370), the forwarded clock signal CLOCK1 will ideally lag behind the data signals DATA1 by the same amount introduced by the tuning etch discussed above. The same is preferably true of the CLOCK2 and DATA2 signals delivered to processor 100b and any other destination processors. The lag in the CLOCK1 and CLOCK2 signals is sufficient to guarantee the setup and hold requirements for the processor sampling logic (as represented by the RECV FLOP latches in FIG. 4) are met. As a result, the individual forwarded clock traces leading to the destination processors do not need to be tuned and tuning etch does not need to be added.

The above discussion is meant to be illustrative of the principles and various embodiments of the present invention. Numerous variations and modifications will become apparent to those skilled in the art once the above disclosure is fully appreciated. For example, the teachings herein may be extended to a system where data is transmitted from a processor to a destination device, such as a logic device as described above or another processor. It is intended that the following claims be interpreted to embrace all such variations and modifications.

What is claimed is:

1. A multiprocessor system, comprising:
    at least one input/output device coupled to at least one processor; and
    a plurality of communications links, each link configured to transmit data packets from a transmitting processor to a receiving processor wherein each communications link comprises;
        a conduction path for each data bit in the data packet; and
        at least one conduction path for a forwarded clock signal that is synchronously transmitted with the data packet;
    wherein a delay in the forwarded clock signal is generated at the transmitting processor by adding tuning etch to the conduction path for the forwarded clock signal prior to transmission of the forwarded clock signal and data bits via the conduction paths in each communications link.

2. The computer system of claim 1 wherein:
    the individual conduction paths in the communications link are substantially parallel and of equal length.

3. The computer system of claim 1 wherein:
    the plurality of communications links are of substantially equal length.

4. The computer system of claim 1 wherein the transmitting processor comprises:
    at least two clock output pins to deliver a first and a second synchronous clock signals off the processor chip; and
    at least two clock input pins to receive the separate clock signals, the second of which is delayed with respect to the first via a longer conduction path between the output pins and input pins on the processor;

wherein the delayed second clock signal is used to trigger logic used to transmit a forwarded clock signal to the plurality of communications links and wherein the first clock signal is used to trigger logic used to transmit data bits to the plurality of communications links.

5. The computer system of claim 4 wherein:
the conduction paths for the first and second clock signals are coupled to termination networks configurable to after the duty cycle of the first and second clock signals.

6. The computer system of claim 4 wherein the logic used to transmit data bits to the plurality of communications links comprises:
parallel latches for sampling each data bit in a data packet triggered by the first clock signal, one triggered on rising edges of the clock signal and one triggered on falling edges of the clock signal; and
multiplexers for each data bit in a data packet triggered by a delayed version of the first clock signal, each multiplexer configured to select between one of the parallel latches for each data bit.

7. The computer system of claim 6 wherein the logic used to transmit the forwarded clock signal to the plurality of communications links comprises:
a multiplexer triggered by a delayed version of the second clock signal, the delay being the same as that generated in the first clock signal;
wherein the multiplexer is configured to select between a logic one and a logic zero.

8. The computer system of claim 4 wherein:
a single clock source is used to generate the first and second synchronous clock signals.

9. An inter-processor communications link, comprising:
a switch configured to transmit digital data packets between a source and a destination; and
point to point transmission paths between the switch and all source and destination devices;
wherein the transmission paths comprise conduction traces for each bit of data to be transmitted and at least one conduction path for a synchronous forwarded clock;
wherein the forwarded clock signals are delayed with respect to the data signals via a single tuning etch independent of the transmission paths; and
wherein all conduction traces in the transmission paths are generally parallel and effectively equal in length.

10. The communications link of claim 9 wherein the switch further comprises:
separate logic for generating the transmitted data signals and forwarded clock signals.

11. The communications link of claim 10 wherein:
the logic for generating the forwarded clock signal is triggered by a first clock signal that is a delayed version of a second clock signal that triggers the logic for generating the data signals; and
wherein the first and second clock signals are generated by the same clock source and the delay in the first clock signal is generated via the tuning etch.

12. The communications link of claim 11 further comprising:
termination networks coupled to the traces for the first and second clock signals in the switch configurable to alter the duty cycle of the first and second clock signals;
wherein the duty cycle of the forwarded clock signal and of the data signals is made nearly symmetric by altering resistor pack values within the termination networks.

13. A digital logic device, comprising:
a plurality of output ports, each port coupled to a point-to-point link coupled in turn to a receiver device;
at least two clock output terminals;
at least two clock input terminals; a clock source;
wherein each point-to-point link comprises parallel conduction traces for individual bits in a data packet and for a synchronous forwarded clock signal;
wherein the forwarded clock signal is delayed with respect to the data signals, said delay created by transmitting a first and a second clock signal off the logic device through clock output terminals and back into the logic device through clock input terminals;
wherein the length of conduction etch between output and input terminals for the first clock signal is substantially longer than that for the second clock signal; and
wherein the forwarded clock signal is generated by output logic triggered by the first clock signal and the data signals are generated by output logic triggered by the second clock signal.

14. The digital logic device of claim 13, wherein:
the first and second dock signals are generated by the same clock source.

15. The digital logic device of claim 13, further comprising:
termination networks coupled to the conduction etch for the first and second dock signals configurable to alter the duty cycle of the first and second clock signals to create symmetric forwarded clock and data signals at the receiver device.

16. A method of reducing tuning etch in source synchronous data transmission comprising:
transmitting data and a corresponding forwarded clock to a plurality of output ports in a source device;
transporting the forwarded clock signals from the output ports to destination devices along a path that is parallel to the corresponding data paths;
adding tuning etch to the conduction trace of a source clock signal that triggers output logic configured to generate all of the forwarded clock signals;
routing a first source clock signal off the source device to a printed wiring board where tuning etch is added to the conduction trace of the first source clock signal;
routing the first source clock signal back into the source device;
triggering clock output logic with the first source clock signal to generate the forwarded clock signal;
triggering data output logic with an undelayed source clock signal to generate data signals; and
transmitting the output of the clock and data output logic to the output port of the source device.

17. The method of claim 16, further comprising:
routing a second source clock signal off the source device to the printed wiring board and back into the source device;
coupling a termination circuit to the conduction trace of the first and second source clock signals;
altering the components in the termination circuit to adjust the duty cycle of the first and second source clock signals to compensate for asymmetries in the conduction paths of the forwarded clock and data signal paths.

18. The method of claim 16, further comprising:
generating the first and second source clock signals with a common clock source.

19. The method of claim 16, further comprising:

generating the forwarded clock signal by latching logic ones and zeros with the first source clock signal.

20. A system, comprising:

a plurality of output clock drivers that generate a first clock output signal and a second clock output signal, said first and second clock output signals based on a common clock signal;

a first trace over which the first clock output signal conducts and second trace over which the second dock output signal conducts, wherein the first and second traces are of different lengths; and a plurality of input clock buffers that receive the first and second clock output signals from the first and second traces;

wherein the first dock output signal is used to generate a forward clock to be provided to a receiver to be used by the receiver to clock data also provided to the receiver; and wherein the second clock output signal is used to control timing associated with the data to be provided to the receiver.

21. The system of claim 20 wherein the length of the first trace is longer than the length of the second trace.

22. The system of claim 20 wherein the length of the first trace is longer than the length of the second trace such that the first clock output signal lags behind the second dock output signal so that the data is received by the receiver prior to the forward clock.

* * * * *